US009218471B2

(12) United States Patent
Horiuchi et al.

(10) Patent No.: US 9,218,471 B2
(45) Date of Patent: Dec. 22, 2015

(54) LOCK FUNCTION HANDLING FOR INFORMATION PROCESSING DEVICES

(71) Applicant: International Business Machines Corporation, Armonk, NY (US)

(72) Inventors: Yoshio Horiuchi, Hiratsuka (JP); Takaaki Kawase, Tokyo (JP); Daisuke Maruyama, Yamato (JP); Satoko Kinoshita, Yokohama (JP)

(73) Assignee: International Business Machines Corporation, Armonk, NY (US)

( * ) Notice: Subject to any disclaimer, the term of this patent is extended or adjusted under 35 U.S.C. 154(b) by 155 days.

(21) Appl. No.: 13/723,453

(22) Filed: Dec. 21, 2012

(65) Prior Publication Data

US 2013/0167224 A1    Jun. 27, 2013

(30) Foreign Application Priority Data

Dec. 22, 2011 (JP) ................................. 2011-281963

(51) Int. Cl.
*G06F 21/31* (2013.01)
*G06F 21/45* (2013.01)

(52) U.S. Cl.
CPC .............. *G06F 21/316* (2013.01); *G06F 21/45* (2013.01); *G06F 2221/2111* (2013.01)

(58) Field of Classification Search
CPC ........ G06F 21/45; G06F 21/46; G06F 21/316
USPC ................... 726/2, 19, 21; 713/183; 340/5.85
See application file for complete search history.

(56) References Cited

U.S. PATENT DOCUMENTS

| 5,835,713 | A  | * | 11/1998 | FitzPatrick et al. ........... 709/204 |
| 6,874,094 | B2 | * | 3/2005  | Parker ........................... 713/310 |
| 7,287,172 | B2 | * | 10/2007 | Parker ........................... 713/310 |
| 8,667,280 | B2 | * | 3/2014  | Sama ............................ 713/168 |
| 8,719,909 | B2 | * | 5/2014  | Fitzgerald et al. ................ 726/7 |

(Continued)

FOREIGN PATENT DOCUMENTS

| CN | 2867771 Y  | 2/2007 |
| CN | 1987830 A  | 6/2007 |

(Continued)

OTHER PUBLICATIONS

Saltzer et al.; The protection of information in computer systems; Published in: Proceedings of the IEEE (vol. 63, Issue: 9 ); pp. 1278-1308; Date of Publication : Sep. 1975; IEEE Xplore.*

(Continued)

*Primary Examiner* — Bradley Holder
(74) *Attorney, Agent, or Firm* — Cantor Colburn LLP; Jeanine Ray-Yartletts

(57) ABSTRACT

Embodiments relate to a method, program product and an information processing device for handling lock functions. The device includes a lock function for restricting user operations and a lock setting unit responsive to the lock function for transitioning the information processing device to a locked state after a period of inactivity. It also includes a lock releasing unit responsive to the lock setting unit for releasing the locked state in response to the input of a predetermined first password and a changing unit responsive to the lock releasing unit for changing the number of characters to be inputted in the first password to release the locked state.

20 Claims, 9 Drawing Sheets

(56) References Cited

U.S. PATENT DOCUMENTS

| | | | |
|---|---|---|---|
| 9,021,548 B2* | 4/2015 | Holtmanns et al. | 726/1 |
| 2002/0078393 A1* | 6/2002 | Parker | 713/324 |
| 2004/0088588 A1* | 5/2004 | Awada et al. | 713/202 |
| 2005/0132180 A1* | 6/2005 | Parker | 713/1 |
| 2007/0022299 A1* | 1/2007 | Yoshimura | 713/183 |
| 2010/0024028 A1* | 1/2010 | Baugher et al. | 726/17 |
| 2010/0325722 A1* | 12/2010 | Uchida | 726/19 |
| 2011/0128119 A1* | 6/2011 | Rao | 340/5.6 |

FOREIGN PATENT DOCUMENTS

| | | | |
|---|---|---|---|
| JP | H08249283 A | 9/1996 | |
| JP | 2009265967 A | 11/2009 | |
| JP | 2011123811 A | 6/2011 | |
| WO | 2010086420 A1 | 8/2010 | |

OTHER PUBLICATIONS

Chamberlin et al.; Views, authorization, and locking in a relational data base system; Published in: Proceeding AFIPS '75; Proceedings of the May 19-22, 1975, national computer conference and exposition; pp. 425-430; ACM Digital Library.*

International Search Report and Written Opinion for PCT/IB2012/057287 filed Dec. 13, 2012, mailed May 16, 2013, 9 pages.

* cited by examiner

LOCK FUNCTION HANDLING FOR INFORMATION PROCESSING DEVICES

PRIORITY

The present application claims priority to Japanese application number 2011-281963 filed Dec. 22, 2011 and all benefits accruing there from under U.S.C. §119, the contents of which is incorporated by reference herein in its entirety.

BACKGROUND

The present disclosure relates generally to information processing, and more specifically to lock function handling for information processing devices.

Most information processing devices, such as personal computers and mobile devices, provide a way to lock the device if they remain unattended. Most often, the lock is automatically enacted when a user operation has not been detected within a fixed period of time. In a "locked state", access is restricted to majority of functions and in most instances previously visible screens no longer are displayed. This is done to ensure the security of the information processing device so that opportunity for access or viewing of the information by unauthorized users is kept to a minimum. The lock on the information processing device is released when the user enters the correct password. The user has to enter a password with a predetermined number of characters to release the lock on the information processing device every time it becomes locked.

BRIEF SUMMARY

Embodiments include a method, computer program product and an information processing device for handling lock functions. The device includes a lock function for restricting user operations and a lock setting unit responsive to the lock function for transitioning the information processing device to a locked state after a period of inactivity. It also includes a lock releasing unit responsive to the lock setting unit for releasing the locked state in response to the input of a predetermined first password and a changing unit responsive to the lock releasing unit for changing the number of characters to be inputted in the first password to release the locked state.

Additional features and advantages are realized through the techniques of the present disclosure. Other embodiments and aspects of the disclosure are described in detail herein. For a better understanding of the disclosure with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The foregoing and other features, and advantages of the disclosure are apparent from the following detailed description taken in conjunction with the accompanying drawings in which:

DETAILED DESCRIPTION

Figure 1:
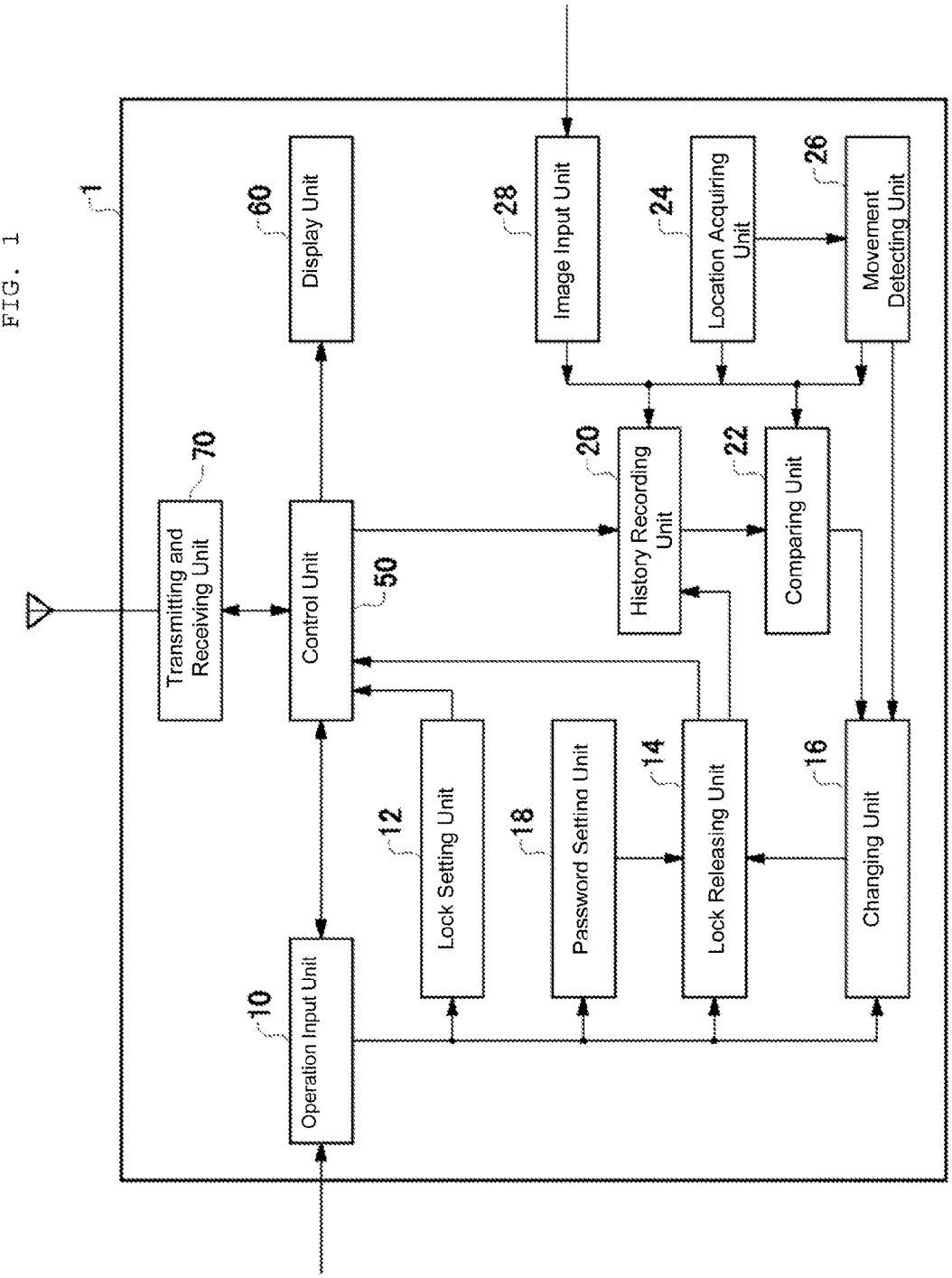
FIG. 1 depicts a diagram showing one configuration of an information processing device in accordance with an embodiment.

FIG. 1 is an illustration according to one embodiment, depicting configuration relation to an exemplary information processing device. For ease of reference, the device is referenced hereinafter as device 1. The information processing device 1 has a lock function for restricting user operations to prevent unauthorized access to data (by others or due to unforeseen events). The information processing device 1 includes an operation input unit 10, a lock setting unit 12, a lock releasing unit 14, a changing unit 16, a password setting unit 18, a history recording unit 20, a comparing unit 22, a location acquiring unit 24, a movement detecting unit 26, an image input unit 28, a control unit 50, a display unit 60, and a transmitting and receiving unit 70. The information processing device 1 can be an electronic device such as a mobile phone terminal, a mobile information terminal, or a laptop computer.

The operation input unit 10 is connected to an input device such as character keys or a touch panel, which is used by the user to input operations. The operation input unit 10 supplies the operation input from the user to the lock setting unit 12 and the changing unit 16. Also, the operation input unit 10 converts the characters inputted by the user into character information, and inputs this information to the lock releasing unit 14, the password setting unit 18, and the control unit 50.

The lock setting unit 12 transmits lock setting signals to the control unit 50 to transition the information processing device 1 to the locked state. The locked state is achieved after a period of inactivity during which no operation has been inputted for a predetermined period of time. The lock releasing unit 14 sends lock releasing signals to the control unit 50 to release a locked state when a string with a predetermined number of characters in a first password, has been inputted (and matched) from the operation input unit 10 while the device is in the locked state. The lock releasing unit 14 changes the number of characters in the first password to be inputted to release the locked state based on an instruction from the changing unit 16. The lock releasing unit can perform the lock-releasing operation using a second password instead of the first password based on an instruction from the changing unit 16. The lock releasing unit 14 for realizing these behaviors can store a predetermined first password and second password. Also, the lock releasing unit 14 may send signals indicating that the lock has been released to the history recording unit 20 for storing in a history.

In this case, the first password can be a simple password, such as the same one used in conjunction with the for the information processing device 1. The second password, in one embodiment, can be the formal password for the information processing device 1. The first password can be shorter than the second password. The security of information processing device 1 can be increased if the first password is not part of the second password. Alternatively, the information processing device 1 is easier to use if the first password is part of the second password.

Depending on the usage of the information processing device 1, the changing unit 16 is enabled to send to the lock releasing unit 14 an instruction to change the number of characters to be inputted in the first password for releasing the locked state. For example, the changing unit 16 changes the number of characters to be inputted in response to the amount of elapsed time since the last user operation was inputted or since the locked state was entered. More specifically, the changing unit 16 can allow the user to release the lock immediately after entering the locked state by inputting a small number of characters, and can gradually increase the number of characters to be inputted as the elapsed time increases since the locked state was entered. In this way, security of the information processing device 1 can be maintained when the device has been idle for a long period of time. This also reduces the password entry burden when the device is frequently operated by the user. In addition, the changing unit 16 can reduce the number of inputted characters when the user has not used the information processing device 1 for a long period of time (for example, several years). Because of the importance of information stored in an information processing device 1 usually lowers when the device has not been used for a long period of time, this allows the information processing device 1 to give precedence to ease of use rather than security.

Furthermore, the changing unit 16 can send an instruction to the lock releasing unit 14 so that the lock releasing unit 14 releases the locked state in response to the input of a predetermined second password rather than the first password when the elapsed time since the number of characters to be inputted was changed to the maximum number of characters in the first password exceeds a predetermined reference elapsed time. In one embodiment, instead of or alternatively in addition to this, the changing unit 16 can increase security, when the current usage of the information processing device 1 is unusual with respect to the usage history, by increasing the number of characters to be inputted, reducing the reference elapsed time, and/or instructing the lock releasing unit 14 to allow release of the lock using the second password without allowing release of the lock using the first password. An example of an unusual usage of the information processing device 1 with respect to the history includes the current location of the information processing device 1 being far from the normal commuting route of the user during commuting hours. In this way, the number of characters to be inputted in the password can be reduced to lower the data entry burden on the user during normal use, but increase security for the information processing device 1 in unusual situations (for example, in which there is a possibility that the device has been stolen by another person.)

The password setting unit 18 allows the user to set the first password and/or second password in response, for example, to the operation input unit 10 receiving a password change instruction from the user when the information processing device 1 is in the lock-released state. The password setting unit 18 sends the first password and/or second password received from the operation input unit 10 to the lock releasing unit 14. For example, the password setting unit 18 may allow the user to set the first password only once during the initial setup. Alternatively, the password setting unit 18 may increase security for the information processing device 1 by allowing the user to set a new first password at a predetermined time each day or every time the lock is released by the user using the second password.

The history recording unit 20 records the usage history of the information processing device 1. For example, the history recording unit 20 may record a usage history including the times, locations and circumstances under which the information processing device 1 was used. The history recording unit 20 may learn behavioral patterns of the user from the usage history. For example, the history recording unit 20 may combine locations along the commuting route of the user with commuting times as a behavioral pattern of the user. Also, the history recording unit 20 may capture an image of the user when a lock releasing signal is received from the lock releasing unit 14, and record the image of the user just before the image processing device 1 was released from the locked state as part of the usage history.

The comparing unit 22 acquires the usage history of the information processing device 1 from the history recording unit 20, and compares current usage of the information processing device 1 to the history. The comparing unit 22 sends the comparison results to the changing unit 16. The location acquiring unit 24 acquires the location of the information processing device 1, for example, via GPS. The location acquiring unit 24 sends the acquired location information to the history recording unit 20 and the comparing unit 22. The movement detecting unit 26 detects movement of the information processing device 1. For example, the movement detecting unit 26 detects movement of the information processing device 1 by measuring the velocity and/or acceleration of the information processing device 1 using a velocity sensor and/or acceleration sensor. Also, the movement detecting unit 26 may detect movement of the information processing device 1 based on a difference in location information acquired by the location acquiring unit 24, for example, via GPS. The movement detecting unit 26 sends the acquired movement information to the changing unit 16, the history recording unit 20, and the comparing unit 22.

The image input unit 28 is connected, for example, to a camera built into the information processing device 1, and an image is inputted such as a facial image taken of the user using the information processing device 1. In the lock-released state, the control unit 50 executes functions in the information processing device 1 such as communication functions, mail functions, Internet browser functions, and the functions of other applications. The control unit 50 restricts user operations excluding password input when a lock setting signal has been received from the lock setting unit 12 and the device has entered the locked state. Also, the control unit 50 releases the locked state when a lock releasing signal is received from the lock releasing unit 14. The display unit 60 is a display device for displaying the results of function execution by the control unit 50.

The transmitting and receiving unit 70 is connected via wires or wirelessly to an external network such as a mobile phone network or the Internet to allow for the exchange of information between the external network and the control unit 50. In this way, the information processing device 1 can ensure the security of the information processing device 1 while also reducing the password entry burden on the user by changing the type of password and the number of characters to be inputted to release the locked state in response to the elapsed time since the last operation and/or usage of the device.

Figure 2:
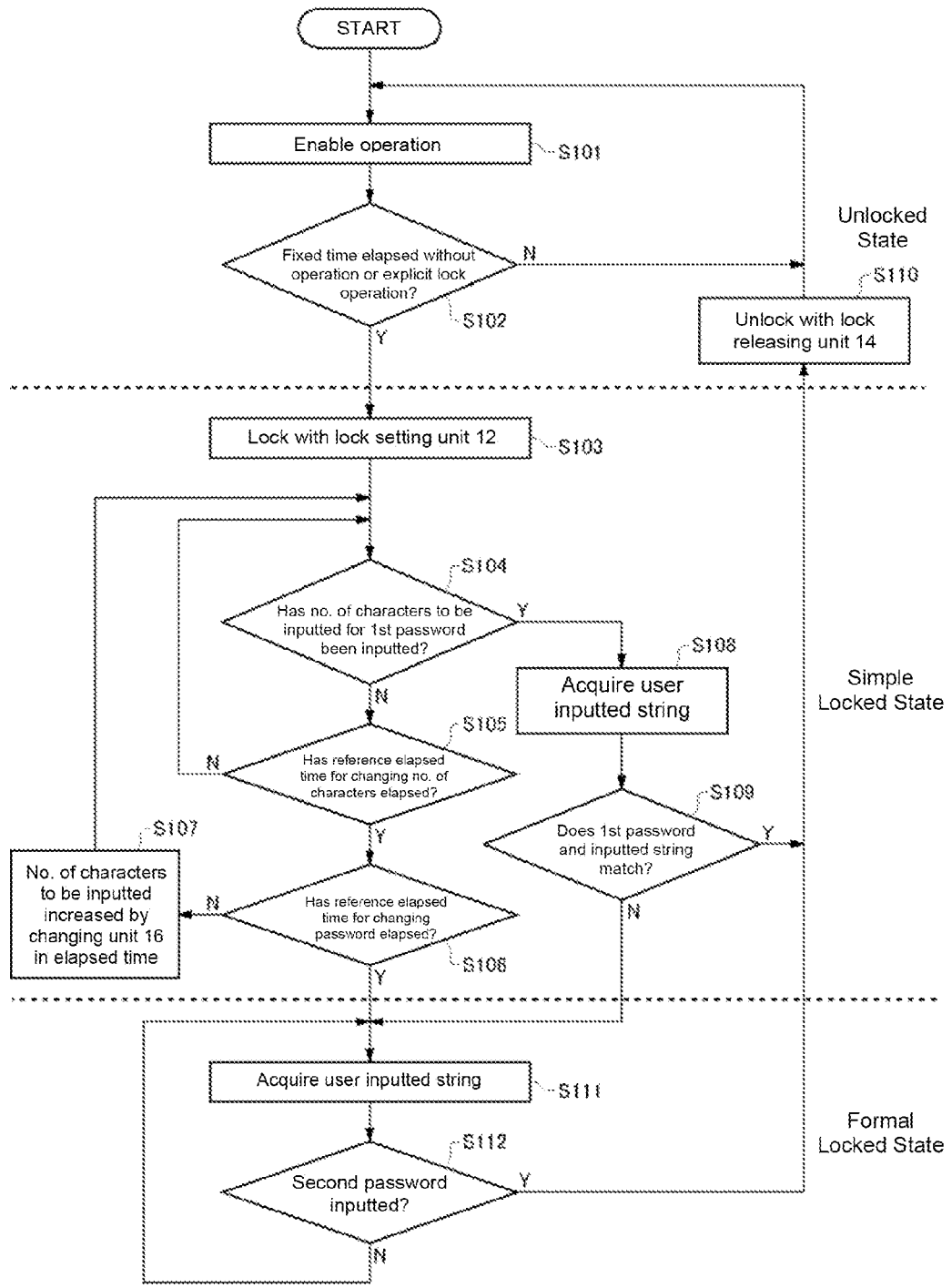
FIG. 2 depicts a flowchart illustrating processing performed by the information processing device in FIG. 1 in accordance with an embodiment.

FIG. 2 is a flowchart illustration of a processing flow performed by the information processing device 1 in the embodiment discussed in conjunction with FIG. 1. In this embodiment, the information processing device 1 increases the number of characters in the password that are to be entered in response to a period of time in which the user has not performed an operation. The information processing device 1 transitions to the locked state in the process from Step S101 to Step S112. The information processing device 1 starts with S101 in which the processing is in a lock-released state. In S101, the user can operate the information processing device 1 to execute its functions. In S101, the password setting unit 18 allows the user to set the first password and/or second password.

In S102, the lock setting unit 12 determines whether or not a user operation has been performed in a predetermined period of time. The user operation can be operating a key using character keys, using a touch panel, or pressing a button provided in the information processing device 1. Other user operations include operating a moving part of the information processing device 1, such as folding or sliding a moving part in a foldable/sliding mobile phone terminal. When a user operation has not been detected within the predetermined period of time (Y in S102), the information processing device 1 advances the process to S103. The information processing device 1 may also advance the process to S103 when an explicit predetermined locking operation (such as folding up a foldable mobile phone terminal) has been performed by the user in S102. When an operation other than a locking operation by the user has been detected within the predetermined period of time (N in S102), the information processing device 1 returns the process to S101.

In S103, the lock setting unit 12 transitions the information processing device 1 to the locked state, and user operations are restricted. In the locked state, the display unit 60 may or may not display on the display unit 60 the number of characters to be inputted for the first password for releasing the lock on the device. Here, the control unit 50 may display on the display unit 60 a screen in which the user is prompted to enter first password or the second password. Next, the information processing device 1 advances the process to the S104. In S104, the lock releasing unit 14 determines whether or not the user has entered the predetermined number of characters of the first password to be entered. For example, when the number of characters of the first password to be entered is a single character, the lock releasing unit 14 determines that the user has entered the number of characters to be inputted as soon as the user has entered a single character. When the number of characters of the first password to be entered is two characters, the lock releasing unit 14 determines that the user has entered the number of characters to be inputted as soon as the user has entered the second character.

When the lock releasing unit 14 has determined that the user has entered the number of characters to be entered in the first password (Y in S104), the information processing device 1 advances the process to S108. When the lock releasing unit 14 has determined that the user has not entered the number of characters to be entered in the first password (N in S104), the information processing device 1 advances the process to S105. In S105, the changing unit 16 determines whether or not the elapsed time since the last operation was performed by the user or since the device was locked has exceeded a predetermined reference elapsed time for changing the number of characters. When the threshold elapsed time has not exceeded the reference elapsed time (N in S105), the information processing device 1 returns the process to S104. However, when the threshold has exceeded the reference elapsed time (Y in S105), the information processing device 1 returns the process to S106.

In S106, the changing unit 16 determines whether or not the elapsed time since the last operation was performed by the user or since the device was locked has exceeded a predetermined reference elapsed time for changing the password. When threshold for elapsed time has not exceeded the reference elapsed time (N in S106), the information processing device 1 advances the process to S107. When the threshold has exceeded the reference elapsed time (Y in S106), the information processing device 1 advances the process to S111. In S107, the changing unit 16 increases the number of characters to be inputted of the first password for the lock releasing unit 14 as the elapsed time increases since the last operation was performed by the user or the device was locked. For example, the number of characters to be inputted may be set at two characters immediately after the last operation performed by the user, and the number of characters to be inputted for the lock releasing unit 14 may be increased by a single character every time a fixed period of time elapses. All of the characters in the first password may eventually be inputted by the user. Here, the number of characters to be inputted immediately after the last operation performed by the user may be greater than a single character but less than all of the characters in the first password, or the changing unit 16 may increase the number of characters to be inputted by a plurality of characters each time. In this way, the security level of the information processing device 1 can be increased as the elapsed time increases.

In S108, the lock releasing unit 14 acquires the string inputted by the user. When the number of characters in the string inputted by the user matches the number of characters to be inputted in the first password, the lock releasing unit 14 may simply acquire the string inputted by the user. When the number of characters in the string inputted by the user is greater, the lock releasing unit 14 may simply not acquire the portion of the string inputted by the user that exceeds the number of characters to be inputted. Next, the information processing device 1 advances the process to S109. In S109, the lock releasing unit 14 determines whether or not the string inputted by the user matches a string with the number of characters in the first password that are to be inputted. For example, when a single character is to be inputted from the first password "1234" and the user has inputted the string "1", the first character in "1234" matches the string inputted by the user, and the unit determines that a string with the number of characters of the first password to be inputted has in fact been inputted. When two characters are to be inputted and the user has inputted the string "12", the two initial characters in "1234" match the string inputted by the user, and the unit determines that a string with the number of characters of the first password to be inputted has in fact been inputted.

In instances where the string inputted by the user matches a string with the number of characters in the first password to be inputted (Y in S109), the information processing device 1 advances the process to S110. When it does not match (N in 109), the information processing device 1 may advance the process to S111, return the process to S104, or return the process to S104 after the changing unit 16 has increased the number of characters in the first password to be inputted.

In S110, the lock releasing unit 14 releases the lock on the information processing device 1. The information processing device 1 then returns the process to S101. In S111, the lock releasing unit 14 acquires the string inputted by the user.

More specifically, the lock releasing unit 14 stands by until the number of characters in the string inputted by the user reaches the number of characters in the second password. Here, the control unit 50 may display on the display unit 60 a screen in which the user is prompted to enter the first password or the second password. When the number of characters inputted by the user reaches the number of characters in the second password, the string inputted by the user is acquired. Alternatively, the lock releasing unit 14 may acquire a fixed string after the user has entered a string and fixed the string by pressing an OK button. Afterwards, the information processing device 1 advances the process to S112.

In S112, the lock releasing unit 14 determines whether or not the string inputted by the user matches the second password. When the content of the string inputted by the user matches the second password (Y in S112), the information processing device 1 advances the process to S110. When it does not match (N in S112), the process is returned to S111. In this embodiment, the information processing device 1 transitions to a simple locked state from the lock-released state using a portion of the first password when the user has not performed an operation for more than a predetermined period of time. Here, the number of characters in the first password to be inputted increases as the time increases in which the user has not operated the information processing device 1. When the time in which the user has not operated the device exceeds a reference elapsed time, the device transitions from the simple locked state to a formal locked state, and entry of a second password with a greater number of characters is requested instead of the first password. In this way, the information processing device 1 can improve security while minimizing the password entry burden on the user.

In S106, when the elapsed time since usage (the last user operation was inputted) or since the locked state was entered has exceeded a certain period the password needs to be changed. For example, if more than a year had passed since these events and the reference elapsed time for changing the password has been greatly exceeded, the changing unit 16 may reduce the number of characters in the first password to be inputted in response to the elapsed time instead of performing the process in S107.

Figure 3:
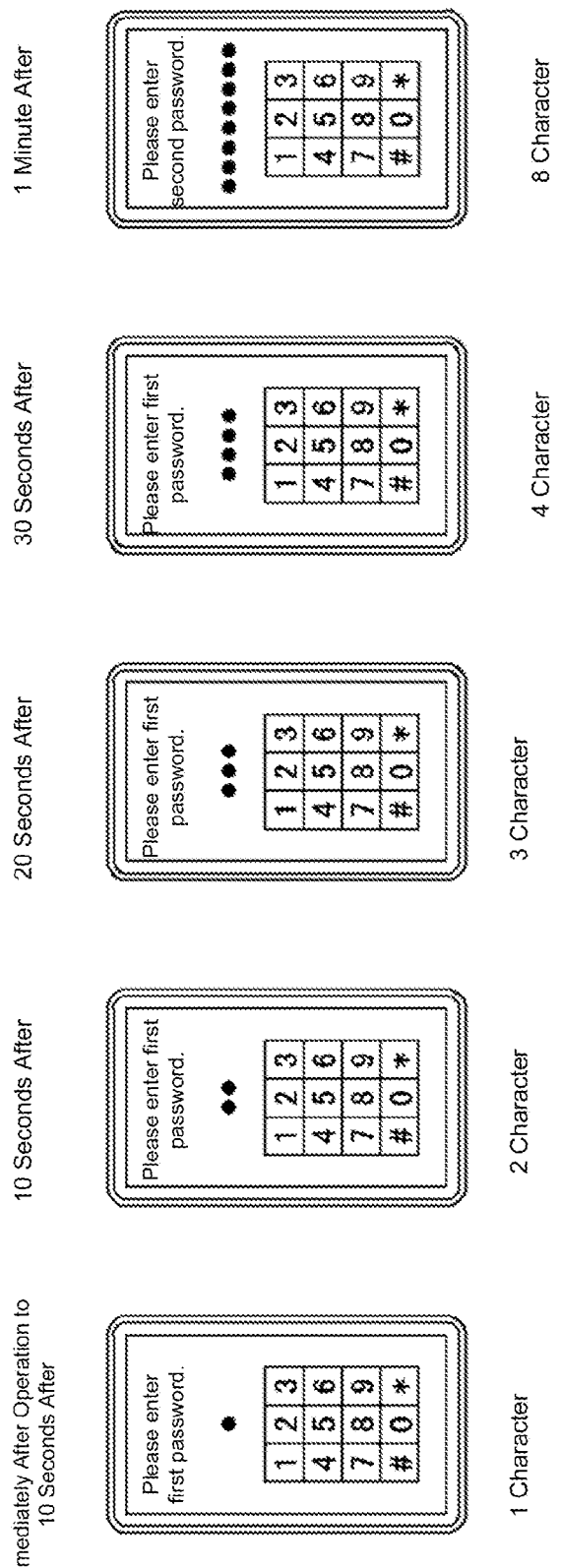
FIG. 3 depicts an exemplary embodiment illustrating a password input screen.

FIG. 3 shows an example of a password input screen in the present embodiment. In the present embodiment, when the elapsed time since the last operation performed by the user is less than 10 seconds, the information processing device 1 requests entry of the first character of the first password from the user. When the elapsed time threshold is equal to or greater than 10 seconds but less than 20 seconds, the information processing device 1 requests entry of the first two characters of the first password. When the elapsed time threshold is equal to or greater than 20 seconds but less than 30 seconds, the information processing device 1 requests entry of the first three characters of the first password. When the elapsed time is equal to or greater than 30 seconds but less than one minute, the information processing device 1 requests entry of the all four characters of the first password. When the elapsed time threshold has exceeded one minute, the information processing device 1 requests entry of the eight-character second password by the user instead of the first password.

Figure 4:
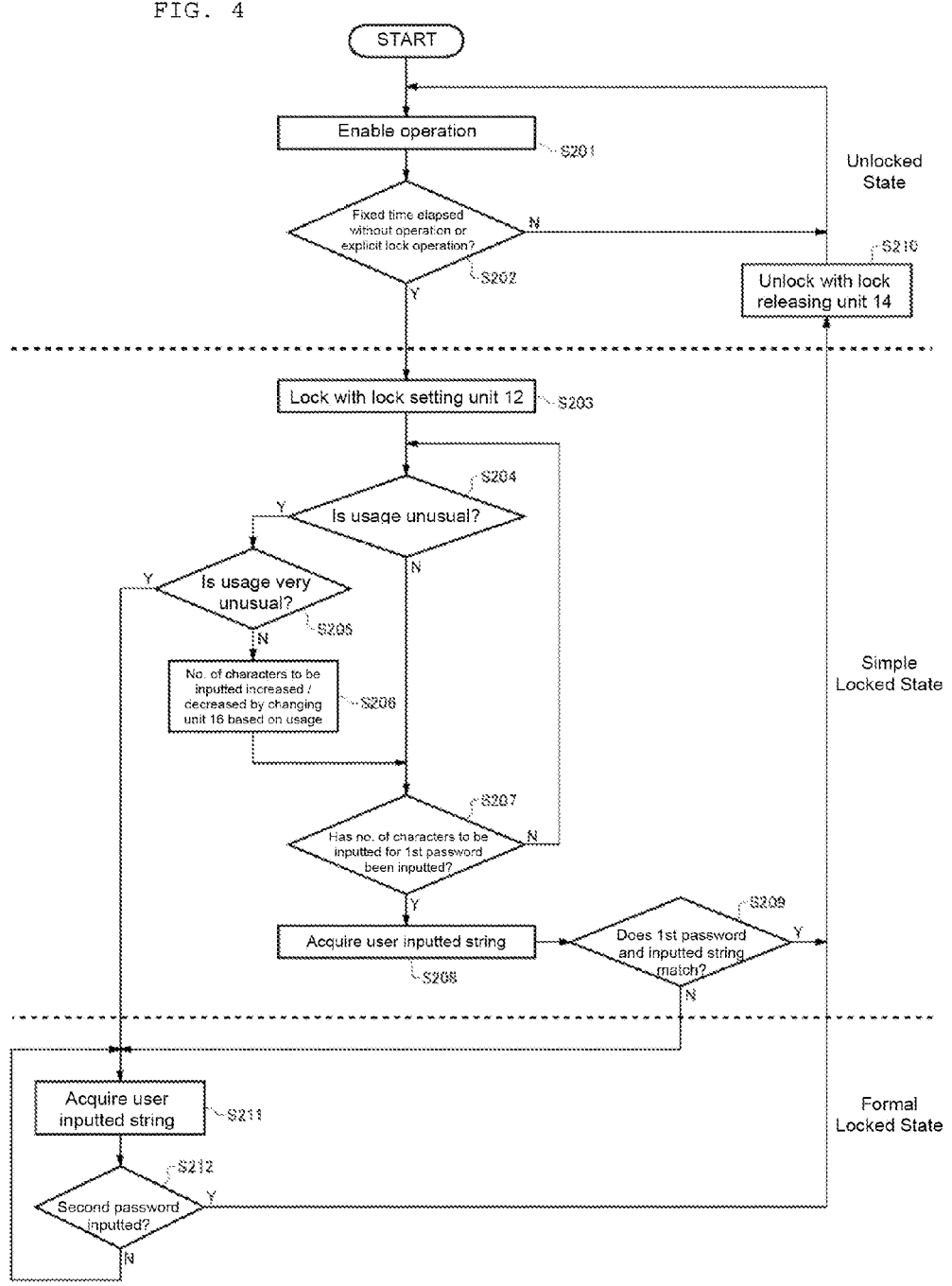
FIG. 4 depicts a flowchart illustrating processing performed by the information processing device of the embodiment of FIG. 1 in accordance to an alternate embodiment.

FIG. 4 is a flowchart illustration of the processing performed by the information processing device 1 in a first alternate embodiment. In this alternate embodiment, the information processing device 1 increases the number of characters in the password to be entered in response to current usage. The information processing device 1 transitions to the locked state in the process from Step S201 to Step S212. The information processing device 1 starts with S201. In S201, as in S101 of the present embodiment, the information processing device 1 allows the user to execute functions, and allows the user to set the first password and/or the second password.

In S201 of this embodiment, the history recording unit 20 records the usage history of the information processing device 1. For example, the history recording unit 20 acquires the usage history of the user by associating and recording the current location of the information processing device 1, the current time and the circumstances, and extracts, categorizes and records the user's behavioral pattern from this usage history. For example, the history recording unit 20 records information such as location information on the commuting route from the user's home to the nearest station, commuting times, and the frequency of the user's commute. It then learns the commuting route and commuting times. For example, the history recording unit 20 successively records the movements of the user, and recognizes the routes frequently taken by the user. The information processing device 1 receives instructions from the user on the route frequently taken by the user, and assigns information identifying a route as a "commuting route". Alternatively, the information processing device 1 may receive instructions on a route from the user ahead of time, and retain the indicated route as a "commuting route". In this way, the comparing unit 22 can determine whether usage is typical of the user when commuting on a certain route at a certain time based on the history in the history recording unit 20. Also, the history recording unit 20 may record as part of the usage history an image of the user just prior to releasing the lock on the information processing device 1.

In addition, in S201, the information processing device 1 may select a specific behavioral pattern from among a plurality of behavioral patterns recorded and classified beforehand by the user in the history recording unit 20. For example, when the commuting destination depends on the day of the week, the device may select prior to the departure of the user the behavioral pattern indicating the route matching that day's commuting destination as the behavioral pattern for that day. In this way, when the user goes to a location outside of the behavioral pattern predicted for that day, the information processing device 1 can determine that usage is unusual and increase security. Furthermore, in S201, the history recording unit 20 may record beforehand an address entered by the user. For example, the history recording unit 20 may acquire from the user and record information such as the address of a location at which the user stays for a long time or which the user frequently visits (e.g., the user's own home, school or office, an acquaintance's house, a store, or a restaurant). Also, the history recording unit 20 may acquire and record a route to a destination acquired by the user from the internet. In this way, the information processing device 1 can determine that the usage is unusual and increase security when the user goes to a location other than a usual location or moves to a location off of the scheduled route for the user. Next, the information processing device 1 advances the process to S202.

In S202, the lock setting unit 12 determines whether or not a user operation has been performed within a predetermined period of time. When a user operation has not been detected within the predetermined period of time or when the user explicitly performs a locking operation (Y in S202), the information processing device 1 advances the process to S203. When a user operation other than a locking operation has been detected within the predetermined period of time (N in S202), the device returns the operation to S201. In S203, the lock setting unit 12 transitions the information processing device 1 to the locked state. Next, the information processing device 1 advances the process to S204.

In S204, the comparison unit 22 compares the usage history recorded in the history recording unit 20 to the current usage, and the changing unit 16 determines whether or not the current usage of the information processing device 1 is unusual with respect to the history based on the results of this comparison. The current usage of the information processing device 1 may be considered unusual with respect to the history when the current location of the information processing device 1 is an unusual location compared to the usual location of the information processing device 1 obtained from the location history. For example, the changing unit 16 may determine that the current usage is unusual when the current location of the information processing device 1 during the commuting time is greater than a reference distance from the user's commuting route recorded in the history recording unit 20. The current usage of the information processing device 1 may also be considered unusual when the current location of the information processing device 1 is greater than a predetermined distance from a scheduled route or scheduled location inputted by the user. More specifically, the changing unit 16 may determine that the current usage is unusual when the current location of the information processing device 1 is greater than a reference distance from a location included along the route to a destination entered into the information processing device 1 by the user.

The current usage of the information processing device 1 may also be considered unusual when the user attempting to release the lock on the information processing device 1 is determined to be different from the user who previously released the lock on the device. More specifically, the changing unit 16 determines that the current usage is unusual when a facial image of the user who previously released the lock the device as recorded in the history recording unit 20 has been compared to a facial image of the current user obtained by the image inputting unit 28 by facial recognition technology, and the same person cannot be recognized in both images. When the changing unit 16 has determined that the current usage is unusual with respect to the history (Y in S204), the information processing device 1 advances the process to S205. When the changing unit 16 has determined that the current usage is not unusual with respect to the history (N in S204), the information processing device 1 advances the process to S207.

In S205, it is determined whether or not the current usage of the information processing device 1 is very unusual with respect to the history. For example, the current usage of the information processing device 1 may be considered very unusual with respect to the history when the current location of the information processing device 1 is very distant from the usual location of the information processing device 1, a location in the selected behavioral pattern, or a location along a scheduled route, or when the current location of the information processing device 1 is unclear for more than a certain period of time. For example, the current usage of the information processing device 1 may be considered very unusual when the location is greater than a second reference distance which is greater than the one used in S204. Also, when the user attempting to release the lock the information processing device 1 differs from the user who previously released the lock on the device and the usage of the information processing device 1 has been deemed unusual in S204, the information processing device 1 may immediately determine that the usage is very unusual with respect to the history. In this way, the information processing device 1 can increase security with respect to operations performed by users other than the original owner. Alternatively, the information processing device 1 may determine that the usage is not "very" unusual in this situation.

In instances when the changing unit 16 has determined that the current usage is very unusual with respect to the history (Y in S205), the information processing device 1 advances the process to S211. When the changing unit 16 has determined that the current usage is not very unusual with respect to the history (N in S205), the information processing device 1 advances the process to S206. In S204 and S205, the information processing device 1 may determine that the usage is "unusual" or "very unusual" when the information processing device 1 has been abandoned or dropped. More specifically, the changing unit 16 may determine that the information processing device 1 has been abandoned when movement information such as acceleration of the information processing device 1 has been acquired from the movement detecting unit 26 and movement of the information processing device 1 has not been detected for more than a predetermined period of time. Also, the changing unit 16 may determine that the information processing device 1 has been dropped when there is a sudden stop in uniform movement or uniform accelerated movement of the information processing device 1 or when the direction of movement suddenly changes to the opposite direction.

In S206, the changing unit 16 increases the number of characters to be inputted in the first password for the lock releasing unit 14 and increases the security level of the information processing device 1 depending on how unusual the current usage of the information processing device is with respect to the history. For example, when the current location of the information processing device 1 nearly matches a usual location, a location in the selected behavioral pattern, or a location along a schedule route, the number of characters to be inputted can simply be one character as the initial value. The information processing device 1 calculates the degree of unusualness, which increases as the current position becomes more distant from a usual location, etc., and the changing unit 16 increases the number of characters to be inputted for the lock releasing unit 14 by a single character as the degree of unusualness increases.

The changing unit 16 may also increase the number of characters to be inputted in the first password for the lock releasing unit 14 when it has been detected in S204 that the information processing device 1 has been abandoned or dropped. In this way, the information processing device 1 can increase the security level when the device has been abandoned or dropped.

The changing unit 16 may also increase the number of characters to be inputted in the first password for the lock releasing unit 14 when it has been determined in S204 that the user attempting to release the lock on the information processing device 1 differs from the user who previously released the lock on the device. In this way, the information processing device 1 can increase the security level with respect to use of the device by other people. Next, the information processing device 1 advances the process to S207. In S207, the lock releasing unit 14 determines whether or not the predetermined number of characters to be entered in the first password has been entered by the user. When the lock releasing unit 14 has determined that the number of characters to be entered in the first password has been entered by the user (Y in S207), the information processing device 1 advances the process to S208. When the lock releasing unit 14 has determined that the number of characters to be entered in the first password has not been entered by the user (N in S207), the information processing device 1 advances the process to S204.

In S208, the lock releasing unit 14 acquires the string entered by the user. When the number of characters in the string inputted by the user matches the number of characters to be inputted in the first password, the lock releasing unit 14 may simply acquire the string inputted by the user. When the number of characters in the string inputted by the user is greater, the lock releasing unit 14 may simply not acquire the portion of the string inputted by the user that exceeds the number of characters to be inputted.

In S209, the lock releasing unit 14 determines whether or not the string inputted by the user matches a string with the number of characters to be inputted in the first password. When the string inputted by the user matches a string with the number of characters in the first password to be inputted (Y in S209), the information processing device 1 advances the process to S210. When it does not match (N in S209), the information processing device 1 may advance the process to S211, return the process to S204, or return the process to S204 after the changing unit 16 has increased the number of characters in the first password to be inputted.

In S210, the lock releasing unit 14 releases the lock on the information processing device 1. When in S204 and S205 the previous and current user releasing the lock on the device have been compared and it has been determined that usage of the device is unusual, the lock releasing unit 14 may notify the history recording unit 20 that the lock on the device has been released, and the history recording unit 20 may take an image of the user releasing the lock on the device with the image inputting unit 28 and record the image. The information processing device 1 then returns the process to S201.

In S211, the lock releasing unit 14 acquires the string inputted by the user. More specifically, the lock releasing unit 14 stands by until the number of characters in the string inputted by the user reaches the number of characters in the second password or the user has inputted a string and pressed the OK button. When the number of character inputted by the user reaches the number of characters in the second password, the string inputted by the user is acquired, and the information processing device 1 advances the process to S212.

In S212, the lock releasing unit 14 determines whether or not the string inputted by the user matches the second password. When the content of the string inputted by the user matches the second password (Y in S212), the information processing device 1 advances the process to S210. When it does not match (N in S212), the information processing device 1 advances the process to S211. In this embodiment, the information processing device 1 transitions from the lock-released state to the simple locked state using a portion of the first password, when the user has not performed an operation within a fixed period of time. Also, the information processing device 1 increases the number of characters to be inputted in the first password when the usage is unusual with respect to the history. In addition, the device transitions from the simple locked state to a formal locked state, and requests entry of a second password, which has a greater number of characters than the first password, when the usage is very unusual with respect to the history. In this way, the information processing device 1 can improve security while minimizing the password entry burden on the user.

Figure 5:
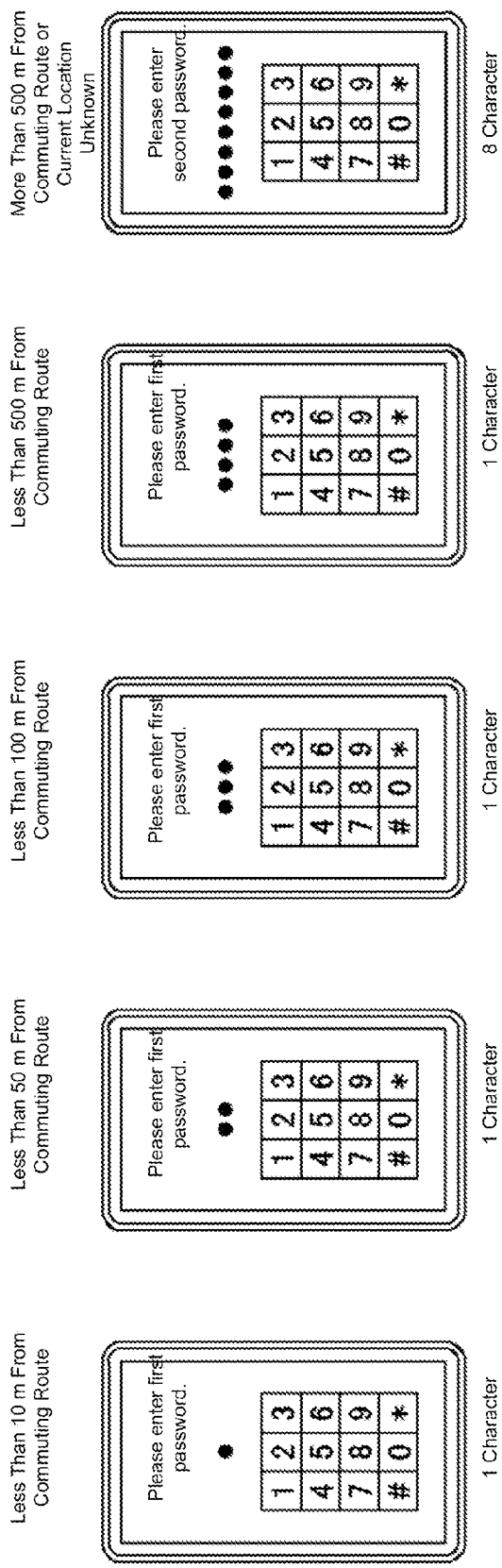
FIG. 5 depicts an exemplary embodiment illustrating a password input screen in accordance to an alternate embodiment.

FIG. 5 illustrates an exemplary embodiment having a password input screen as per an alternate embodiment. In this embodiment, the history recording unit 20 records the commuting route of the user in advance, and the changing unit 16 determines that the usage of the device is unusual when the current location of the information processing device 1 is equal to or greater than 10 m from the commuting route. More specifically, the information processing device 1 requests from the user entry of the initial character of the first password when the current location is less than 10 m from the commuting route. Also, the information processing device 1 requests from the user entry of the first two characters of the first password when the current location is equal to or more than 10 m but less than 50 m from the commuting route. Also, the information processing device 1 requests from the user entry of the first three characters of the first password when the current location is equal to or more than 50 m but less than 100 m from the commuting route. Also, the information processing device 1 requests from the user entry of the first four characters of the first password when the current location is equal to or more than 100 m but less than 500 m from the commuting route. Also, the information processing device 1 requests from the user entry of the eight-character second password instead of the first password when the current location of the device is more than 500 m from the commuting route or when current location is unclear for more than a predetermined amount of time.

Figure 6:
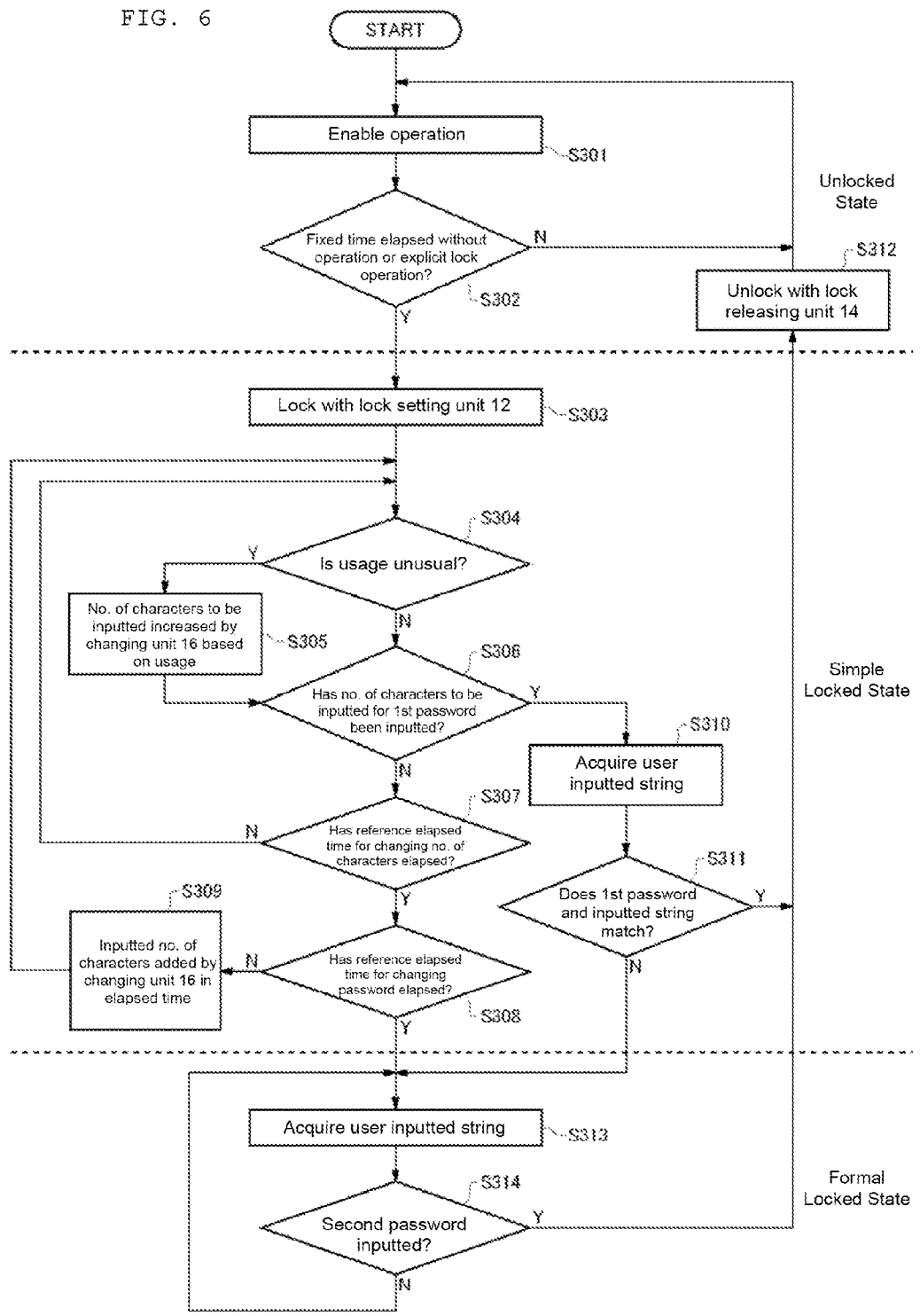
FIG. 6 depicts a flowchart illustrating processing performed by the information processing device of the embodiment of FIG. 1 in accordance to a second alternate embodiment.

FIG. 6 depicts a flowchart illustrating a processing operation performed by the information processing device 1 in a different alternative embodiment. In the present variation, the information processing device 1 increases the number of characters in the password to be inputted depending on the period in which a user operation has not been performed and current usage. The information processing device 1 transitions to the locked state in the process from Step S301 to Step S314. The information processing device 1 starts with S301. In S301, as in S101 of the present embodiment, the information processing device 1 allows the user to execute functions, and allows the user to set the first password and/or the second password. In S301, as in the first variation in S201, the history recording unit 20 records the usage history of the information processing device.

In S302, the lock setting unit 12 determines whether or not a user operation has been performed within a predetermined period of time. When a user operation has not been detected within the predetermined period of time or when the user explicitly performs a locking operation (Y in S302), the information processing device 1 advances the process to S303. When a user operation other than a locking operation has been detected within the predetermined period of time (N in S302), the device returns the operation to S301. In S303, the lock setting unit 12 transitions the information processing device 1 to the locked state. Next, the information processing device 1 advances the process to S304.

In S304, the comparison unit 22 compares the usage history recorded in the history recording unit 20 to the current usage, and the changing unit 16 determines whether or not the current usage of the information processing device 1 is unusual with respect to the history based on the results of this comparison. When the changing unit 16 has determined that the current usage is unusual with respect to the history (Y in S304), the information processing device 1 advances the process to S305. When the changing unit 16 has determined that the current usage is not unusual with respect to the history (N in S304), the information processing device 1 advances the process to S306. The information processing device 1 may advance the process immediately to S313 when it has been determined in S304 that the information processing device 1 has been abandoned or dropped.

In S305, the changing unit 16 increases the number of characters to be inputted in the first password for the lock releasing unit 14 and increases the security level of the information processing device 1 based on how unusual the current usage of the information processing device is with respect to the history.

In S306, the lock releasing unit 14 determines whether or not the predetermined number of characters to be entered in the first password has been entered by the user. When it has been determined that the number of characters to be entered in the first password has been entered by the user (Y in S306), the information processing device 1 advances the process to S310. When it has been determined that the number of characters to be entered in the first password has not been entered by the user (N in S306), the information processing device 1 advances the process to S307.

In S307, the changing unit 16 determines whether or not the elapsed time since the last operation was performed by the user or since the device was locked has exceeded a reference elapsed time for changing the predetermined number of characters. When the threshold for the elapsed time has not exceeded the reference elapsed time (N in S307), the information processing device 1 returns the process to S304. When the threshold for the elapsed time has exceeded the reference elapsed time (Y in S307), the information processing device 1 returns the process to S308.

In S308, the changing unit 16 determines whether or not the elapsed time since the last operation was performed by the user or since the device was locked has exceeded a reference elapsed time for changing the predetermined password. When the elapsed time has not exceeded threshold for reference elapsed time (N in S308), the information processing device 1 advances the process to S309. When the threshold elapsed time has exceeded the reference elapsed time (Y in S308), the information processing device 1 advances the process to S313.

In S309, the changing unit 16 increases the number of characters to be inputted in the first password for the lock releasing unit 14 as the elapsed time increases since the last operation was performed by the user or the device was locked. In this way, the security level of the information processing device 1 can be increased as the elapsed time increases. Next, the information processing device 1 returns the process to S304.

In S310, the lock releasing unit 14 acquires the string inputted by the user. When the number of characters in the string inputted by the user matches the number of characters to be inputted in the first password, the lock releasing unit 14 may simply acquire the string inputted by the user. When the number of characters in the string inputted by the user is greater, the lock releasing unit 14 may simply not acquire the portion of the string inputted by the user that exceeds the number of characters to be inputted. Next, the information processing device 1 advances the process to S311.

In S311, the lock releasing unit 14 determines whether or not the string inputted by the user matches a string with the number of characters to be inputted in the first password. When the string inputted by the user matches a string with the number of characters in the first password to be inputted (Y in S311), the information processing device 1 advances the process to S312. When it does not match (N in S311), the information processing device 1 may advance the process to S313, return the process to S304, or return the process to S304 after the changing unit 16 has increased the number of characters in the first password to be inputted.

In S312, the lock releasing unit 14 releases the lock on the information processing device 1. When, in S304, the previous and current user releasing the lock on the device have been compared and it has been determined that usage of the device is unusual, the lock releasing unit 14 may notify the history recording unit 20 that the lock on the device has been released, and the history recording unit 20 may take an image of the user releasing the lock on the device with the image inputting unit 28 and record the image. The information processing device 1 then returns the process to S301.

In S313, the lock releasing unit 14 acquires the string inputted by the user. More specifically, the lock releasing unit 14 stands by until the number of characters in the string inputted by the user reaches the number of characters in the second password or the user has inputted a string and pressed the OK button. When the number of character inputted by the user reaches the number of characters in the second password, the string inputted by the user is acquired, and the information processing device 1 advances the process to S314.

In S314, the lock releasing unit 14 determines whether or not the string inputted by the user matches the second password. When the content for the inputted string by the user matches the second password (Y in S314), the information processing device 1 advances the process to S312. When it does not match (N in S314), the information processing device 1 advances the process to S313.

In this embodiment, the information processing device 1 transitions from the lock-released state to the simple locked state using a portion of the first password, when the user has not performed an operation within a fixed period of time. Also, the information processing device 1 increases the number of characters to be inputted in the first password when the usage is unusual with respect to the history and the user has not operated the information processing device 1 within a certain period of time. In addition, the device transitions from the simple locked state to a formal locked state, and requests entry of a second password, which has a greater number of characters than the first password, when the period of time in which the device has not been operated exceeds a reference elapsed time. In this way, the information processing device 1 can improve security while minimizing the password entry burden on the user.

Figure 7:
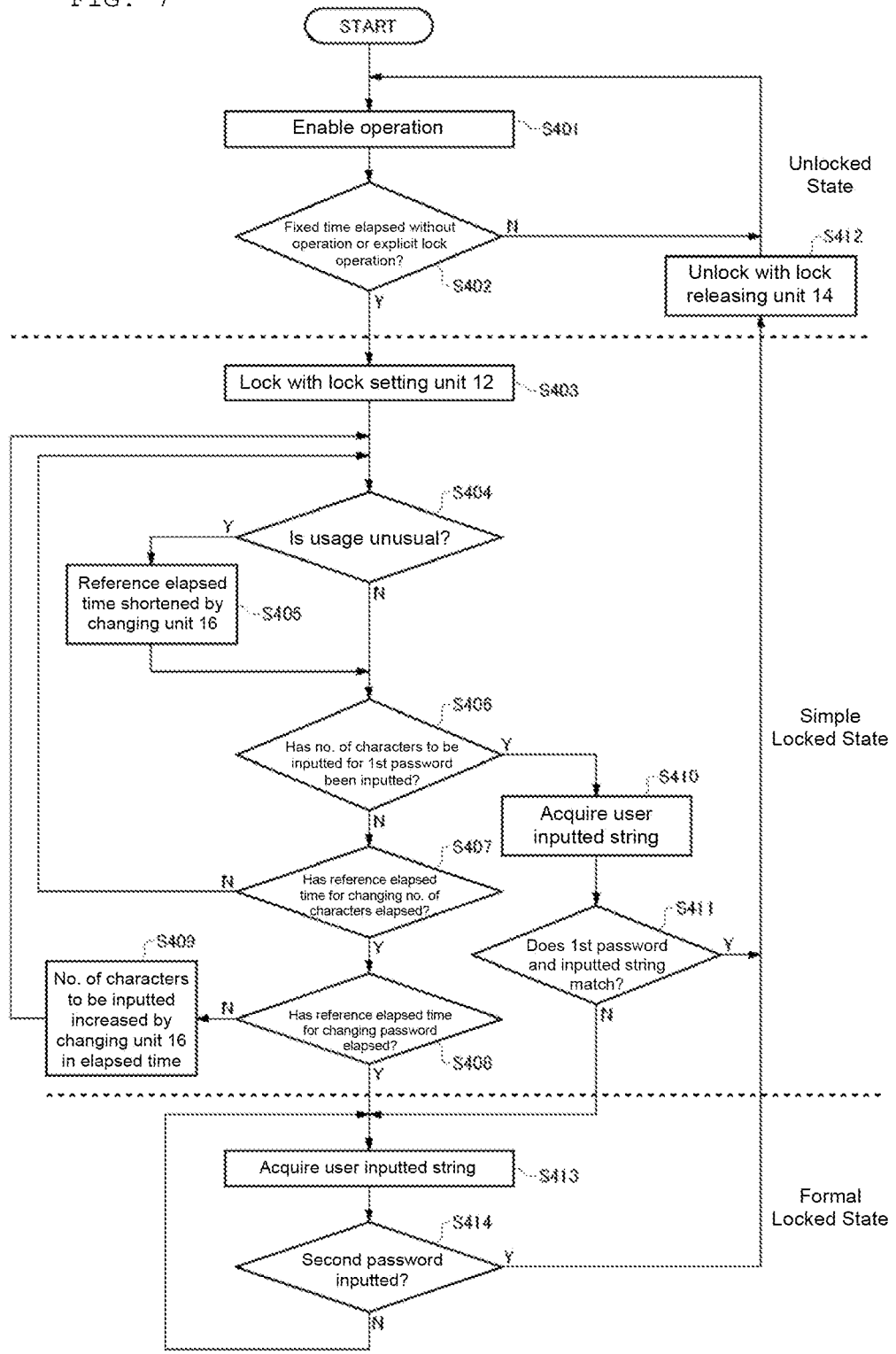
FIG. 7 depicts a flowchart illustrating processing performed by the information processing device of the embodiment of FIG. 1 in accordance to a third alternate embodiment.

FIG. 7 is an illustration of a flowchart depicting processing operation performed by the information processing device 1 in another alternate embodiment. In the present variation, the information processing device 1 increases the number of characters in the password to be inputted based on the period of time in which a user operation has not been performed, and reduces the reference elapsed time for changing the password when the current usage is unusual. The information processing device 1 transitions to the locked state in the process from Step S401 to Step S414. The information processing device 1 starts with S401. In S401, as in S101 of the present embodiment, the information processing device 1 allows the user to execute functions, and allows the user to set the first password and/or the second password. In S401, as in the first variation in S201, the history recording unit 20 records the usage history of the information processing device 1.

In S402, the lock setting unit 12 determines whether or not a user operation has been performed within a predetermined period of time. When a user operation has not been detected within the predetermined period of time or when the user explicitly performs a locking operation (Y in S402), the information processing device 1 advances the process to S403. When a user operation other than a locking operation has been determined within the predetermined period of time (N in S402), the device returns the operation to S401. In S403, the lock setting unit 12 transitions the information processing device 1 to the locked state. Next, the information processing device 1 advances the process to S404.

In S404, the comparison unit 22 compares the usage history recorded in the history recording unit 20 to the current usage, and the changing unit 16 determines whether or not the current usage of information processing device 1 is unusual with respect to the history based on the results of this comparison. When the changing unit 16 has determined that the current usage is unusual with respect to the history (Y in S404), the information processing device 1 advances the process to S405. When the changing unit 16 has determined that the current usage is not unusual with respect to the history (N in S404), the information processing device 1 advances the process to S406. The information processing device 1 may advance the process immediately to S413 when it has been determined in S404 that the information processing device 1 has been abandoned or dropped.

In S405, the changing unit 16 reduces the reference elapsed time used as the basis for the elapsed time in which there is a transition from locking using the first password to locking using the second password. Instead of or in addition to this, the changing unit 16 may reduce the reference elapsed time for changing the number of characters to be inputted in the first password.

In S406, the lock releasing unit 14 determines whether or not the predetermined number of characters to be entered in the first password has been entered by the user. When it has been determined that the number of characters to be entered in the first password has been entered by the user (Y in S406), the information processing device 1 advances the process to S410. When it has been determined that the number of characters to be entered in the first password has not been entered by the user (N in S406), the information processing device 1 advances the process to S407.

In S407, the changing unit 16 determines whether or not the elapsed time since the last operation was performed by the user or since the device was locked has exceeded a reference elapsed time for changing the predetermined number of characters. When the elapsed time has not exceeded the threshold reference elapsed time (N in S407), the information processing device 1 returns the process to S404. When the elapsed time has exceeded threshold the reference elapsed time (Y in S407), the information processing device 1 returns the process to S408.

In S408, the changing unit 16 determines whether or not the elapsed time since the last operation was performed by the user or since the device was locked has exceeded a reference elapsed time for changing the predetermined password. When the elapsed time has not exceeded the reference threshold elapsed time (N in S408), the information processing device 1 advances the process to S409. When the elapsed time has exceeded the threshold reference elapsed time (Y in S408), the information processing device 1 advances the process to S413.

In S409, the changing unit 16 increases the number of characters to be inputted in the first password for the lock releasing unit 14 as the elapsed time increases since the last operation was performed by the user or the device was locked. In this way, the security level of the information processing device 1 can be increased as the elapsed time increases. Next, the information processing device 1 returns the process to S404.

In S410, the lock releasing unit 14 acquires the string inputted by the user. When the number of characters in the string inputted by the user matches the number of characters to be inputted in the first password, the lock releasing unit 14 may simply acquire the string inputted by the user. When the number of characters in the string inputted by the user is greater, the lock releasing unit 14 may simply not acquire the portion of the string inputted by the user that exceeds the number of characters to be inputted.

In S411, the lock releasing unit 14 determines whether or not the string inputted by the user matches a string with the number of character(s) to be inputted in the first password. When the string inputted by the user matches a string with the number of characters in the first password to be inputted (Y in S411), the information processing device 1 advances the process to S412. When it does not match (N in S411), the information processing device 1 may advance the process to S413, return the process to S404, or return the process to S404 after the changing unit 16 has increased the number of characters to be inputted in the first password.

In S412, the lock releasing unit 14 releases the lock on the information processing device 1. When, in S404, the previous and current user releasing the lock on the device have been compared and it has been determined that usage of the device is unusual, the lock releasing unit 14 may notify the history recording unit 20 that the lock on the device has been released, and the history recording unit 20 may take an image of the user releasing the lock on the device with the image inputting unit 28 and record the image. The information processing device 1 then returns the process to S401.

In S413, the lock releasing unit 14 acquires the string inputted by the user. More specifically, the lock releasing unit 14 stands by until the number of characters in the string inputted by the user reaches the number of characters in the second password or the user has inputted a string and pressed the OK button. When the number of character inputted by the user reaches the number of characters in the second password, the string inputted by the user is acquired, and the information processing device 1 advances the process to S414.

In S414, the lock releasing unit 14 determines whether or not the content of the string inputted by the user matches the second password. When the content of the string inputted by the user matches the second password (Y in S414), the information processing device 1 advances the process to S412. When it does not match (N in S414), the information processing device 1 returns the process to S413. In this variation, the information processing device 1 transitions from the lock-released state to the simple locked state using a portion of the first password, when the user has not performed an operation within a fixed period of time. Also, the information processing device 1 increases the number of characters to be inputted in the first password when the user has not operated the information processing device 1 within a certain period of time. In addition, the device transitions from the simple locked state to a formal locked state, and requests entry of a second password, which has a greater number of characters than the first password, when the period of time in which the device has not been operated exceeds a reference elapsed time for changing the password. In this way, the information processing device 1 can improve security while minimizing the password entry burden on the user.

Figure 8:
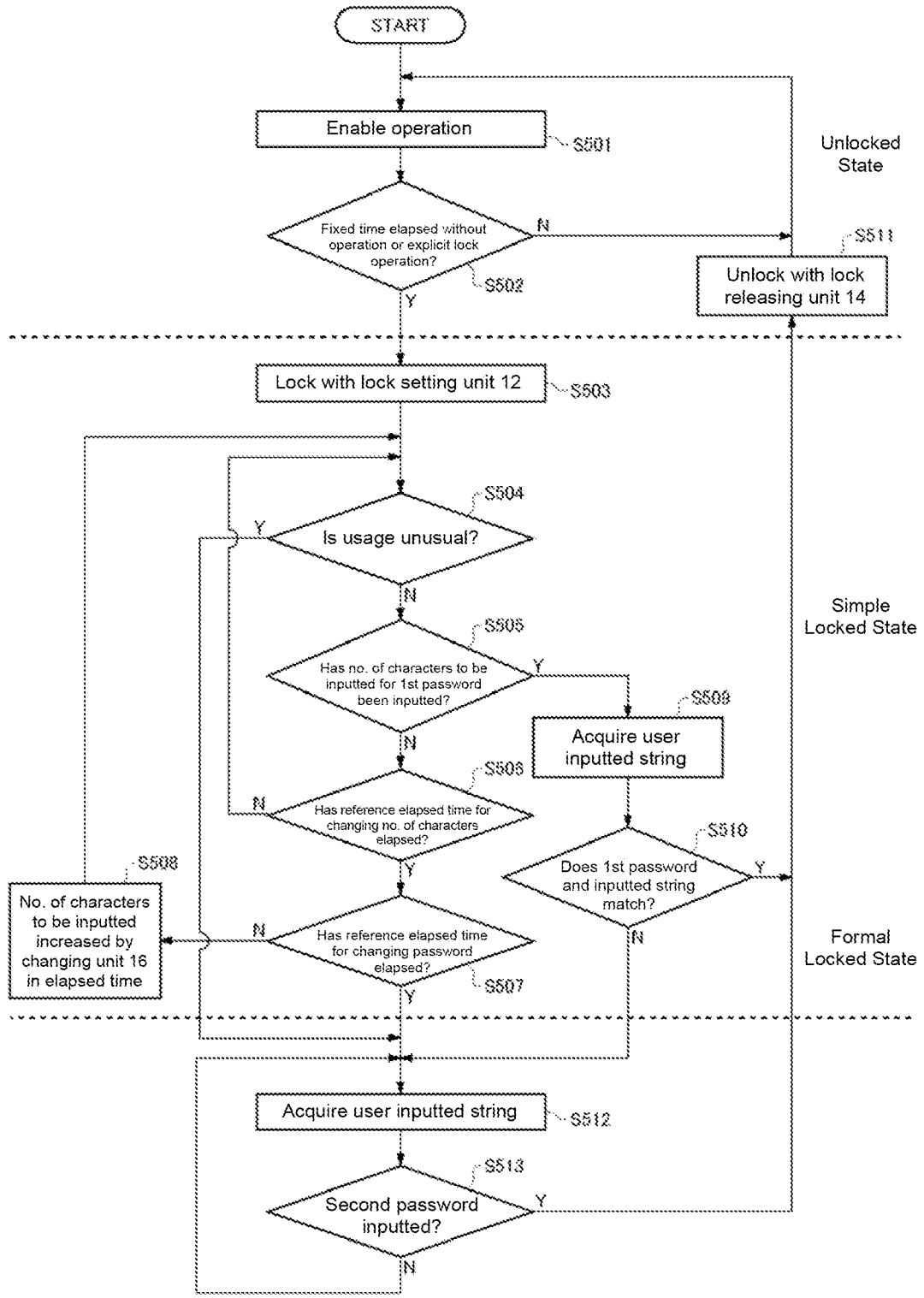
FIG. 8 depicts a flowchart illustrating processing performed by the information processing device of the embodiment of FIG. 1 in accordance to a forth alternate embodiment.

FIG. 8 is a flowchart illustration of a processing operation performed by the information processing device 1 in another alternative embodiment. In the present variation, the information processing device 1 increases the number of characters in the password to be inputted based on the period of time in which a user operation has not been performed, and immediately transitions to a protective state using a second password when the current usage is unusual. The information processing device 1 transitions to the locked state in the process from Step S501 to Step S513.

The information processing device 1 starts with S501. In S501, as in S101 of the present embodiment, the information processing device 1 allows the user to execute functions, and allows the user to set the first password and/or the second password. In S501, as in the first variation in S201, the history recording unit 20 records the usage history of the information processing device 1. Next, the information processing device 1 advances the process to S502.

In S502, the lock setting unit 12 determines whether or not a user operation has been performed within a predetermined period of time. When a user operation has not been detected within the predetermined period of time or when the user explicitly performs a locking operation (Y in S502), the information processing device 1 advances the process to S503. When an operation other than a locking operation has been detected within the predetermined period of time (N in S502), the information processing device 1 returns the operation to S501. In S503, the lock setting unit 12 transitions the information processing device 1 to the locked state.

In S504, the comparison unit 22 compares the usage history recorded in the history recording unit 20 to the current usage, and the changing unit 16 determines whether or not the current usage of the information processing device 1 is unusual with respect to the history based on the results of this comparison. When the changing unit 16 has determined that the current usage is unusual with respect to the history (Y in S504), the information processing device 1 advances the process to S512. When the changing unit 16 has determined that the current usage is not unusual with respect to the history (N in S504), the information processing device 1 advances the process to S505.

In S505, the lock releasing unit 14 determines whether or not the predetermined number of characters to be entered in the first password has been entered by the user. When it has been determined that the number of characters to be entered in the first password has been entered by the user (Y in S505), the information processing device 1 advances the process to S509. When it has been determined that the number of characters to be entered in the first password has not been entered by the user (N in S505), the information processing device 1 advances the process to S506.

In S506, the changing unit 16 determines whether or not the elapsed time since the last operation was performed by the user or since the device was locked has exceeded a reference elapsed time for changing the predetermined number of characters. When the elapsed time has not exceeded the threshold reference elapsed time (N in S506), the information processing device 1 returns the process to S504. When the elapsed time has exceeded the threshold reference elapsed time (Y in S506), the information processing device 1 advances the process to S507.

In S507, the changing unit 16 determines whether or not the elapsed time since the last operation was performed by the user or since the device was locked has exceeded a reference elapsed time for changing the predetermined password. When the elapsed time has not exceeded the threshold reference elapsed time (N in S507), the information processing device 1 advances the process to S508. When the elapsed time has exceeded the threshold reference elapsed time (Y in S507), the information processing device 1 advances the process to S512. In S508, the changing unit 16 increases the number of characters to be inputted in the first password for the lock releasing unit 14 as the elapsed time increases since the last operation was performed by the user or the device was locked. In this way, the security level of the information processing device 1 can be increased as the elapsed time increases.

In S509, the lock releasing unit 14 acquires the string inputted by the user. When the number of characters in the string inputted by the user matches the number of characters to be inputted in the first password, the lock releasing unit 14 may simply acquire the string inputted by the user. When the number of characters in the string inputted by the user is greater, the lock releasing unit 14 may simply not acquire the portion of the string inputted by the user that exceeds the number of characters to be inputted. Next, the information processing device 1 advances the process to S510.

In S510, the lock releasing unit 14 determines whether or not the string inputted by the user matches a string with the number of characters in the first password that are to be inputted. When the string inputted by the user matches a string with the number of characters in the first password to be inputted (Y in S510), the information processing device 1 advances the process to S511. When it does not match (N in S510), the information processing device 1 may advance the process to S512, return the process to S504, or return the process to S504 after the changing unit 16 has increased the number of characters in the first password to be inputted.

In S511, the lock releasing unit 14 releases the lock on the information processing device 1. When, in S504, the previous and current user releasing the lock on the device have been compared and it has been determined that usage of the device is unusual, the lock releasing unit 14 may notify the history recording unit 20 that the lock on the device has been released, and the history recording unit 20 may take an image of the user releasing the lock on the device with the image inputting unit 28 and record the image. The information processing device 1 then returns the process to S501.

In S512, the lock releasing unit 14 acquires the string inputted by the user. More specifically, the lock releasing unit 14 stands by until the number of characters in the string inputted by the user reaches the number of characters in the second password or the user has inputted a string and pressed the OK button. When the number of character inputted by the user reaches the number of characters in the second password, the string inputted by the user is acquired, and the information processing device 1 advances the process to S513.

In S513, the lock releasing unit 14 determines whether or not the string inputted by the user matches the second password. When the content of the string inputted by the user matches the second password (Y in S513), the information processing device 1 advances the process to S511. When it does not match (N in S513), the information processing device 1 returns the process to S512.

In this alternate embodiment, the information processing device 1 transitions from the lock-released state to the simple locked state using a portion of the first password, when the user has not performed an operation within a fixed period of time. Also, the information processing device 1 increases the number of characters to be inputted in the first password when the user has not operated the information processing device 1 within a certain period of time. In addition, the device transitions from the simple locked state to a formal locked state, and requests entry of a second password, which has a greater number of characters than the first password, when the period of time in which the device has not been operated exceeds a reference elapsed time for changing the password. Also, the information processing device 1 immediately transitions to the safe formal locked state when the usage of the device is unusual with respect to the history. In this way, the information processing device 1 can improve security with respect to use of the device by other people while minimizing the password entry burden on the user.

Figure 9:
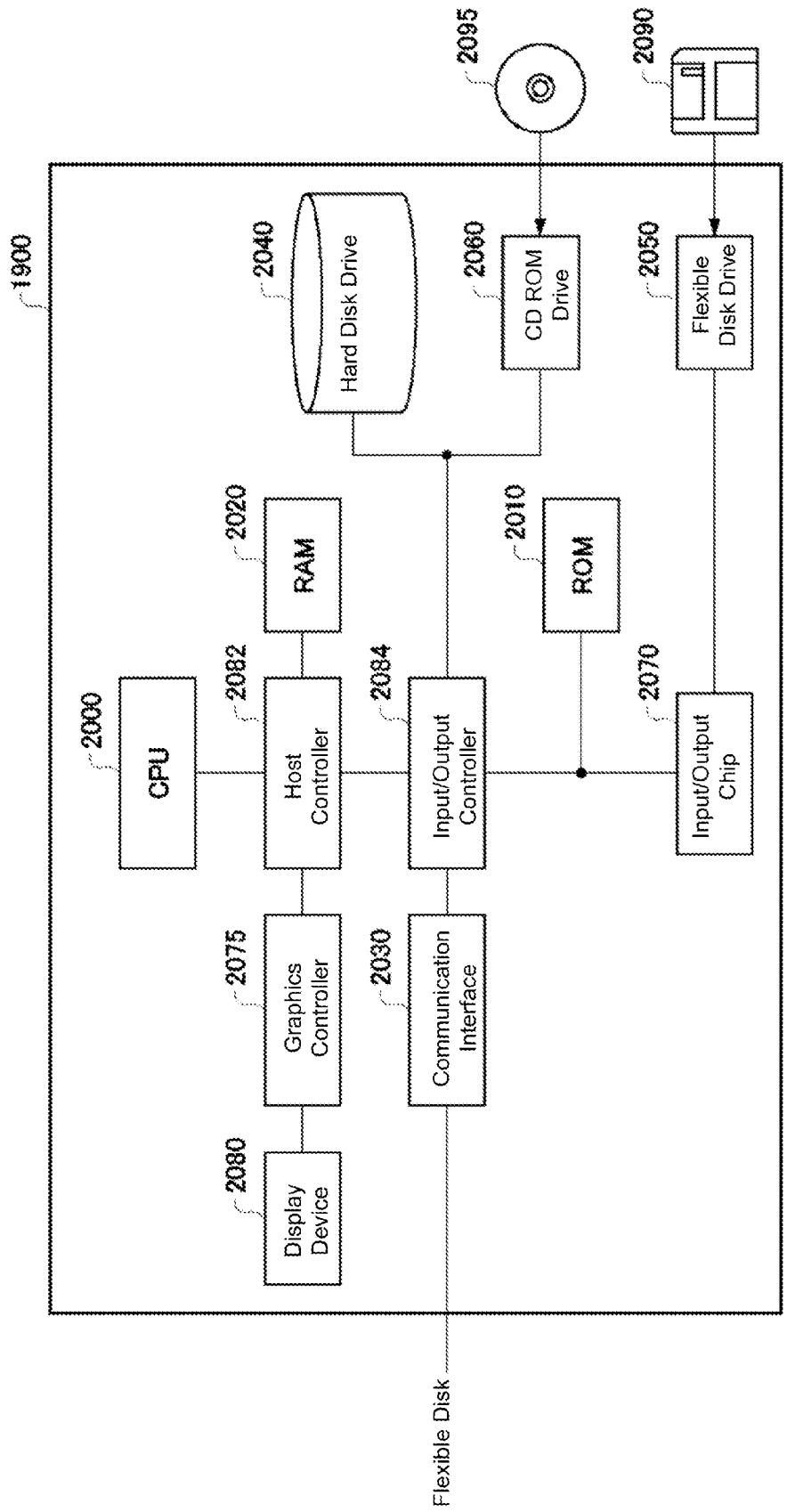
FIG. 9 depicts an exemplary embodiment illustrating a hardware configuration in accordance to an embodiment.

FIG. 9 is an illustration of an exemplary diagram depicting a hardware configuration for a computer. In this embodiment, the computer 1900 serves as the information processing device 1. The computer 1900 is equipped with a CPU peripheral portion having a CPU 2000, RAM 2020, graphics controller 2075 and display device 2080 connected to each other by a host controller 2082, an input/output portion having a communication interface 2030, a hard disk drive 2040 and a CD-ROM drive 2060 connected to the host controller 2082 by an input/output controller 2084, and a legacy input/output portion having a ROM 2010, flexible disk drive 2050, and input/output chip 2070 connected to the input/output controller 2084.

The host controller 2082 is connected to RAM 2020, a CPU 2000 accessing the RAM 2020 at a high transfer rate, and a graphics controller 2075. The CPU 2000 is operated on the basis of a program stored in the ROM 2010 and the RAM 2020, and controls the various units. The graphics controller 2075 acquires the image data generated in the frame buffer of the RAM 2020 by the CPU 2000 and other units, and displays this image data on the display device 2080. The display unit 60 in the present embodiment may be display device 2080. Alternatively, the graphics controller 2075 can include a frame buffer for storing image data generated by the CPU 2000 and other units.

The input/output controller 2084 is connected to a host controller 2082, a communication interface 2030 serving as a relatively high-speed input/output device, a hard disk drive 2040, and a CD-ROM drive 2060. The communication interface 2030 communicates with the other devices via a network. Also, the communication interface may be connected to the transmitting and receiving unit 70. The hard disk drive 2040 stores the programs and data used by the CPU 2000 in the computer 1900. The CD-ROM drive 2060 reads programs and data from the CD-ROM 2095 and provides them to the hard disk drive 2040 via the RAM 2020.

The input/output controller 2084 is connected to the ROM 2010, the flexible disk drive 2050, and the relatively low-speed input/output device of the input/output chip 2070. The ROM 2010 stores the boot program executed by the computer 1900 at startup and/or programs relying on hardware in the computer 1900. The flexible disk drive 2050 reads programs or data from a flexible disk drive 2090, and provides the programs and data to the hard disk drive 2040 via the RAM 2020. The input/output chip 2070 connects the flexible disk drive 2050 to the input/output controller 2084. Various types of input/output device are connected to the input/output controller 2084 via a parallel port, serial port, keyboard port, mouse port, or the like as can be appreciated by those skilled in the art.

A program provided to the hard disk drive 2040 via the RAM 2020 is stored on a recording medium such as a flexible disk 2090, CD-ROM 2095 or IC card, and provided by the user. A program is read from the recording medium, installed in the hard disk drive 2040 inside the computer 1900 via the RAM 2020, and executed by the CPU 2000. Programs installed in a computer 1900 to enable the computer 1900 to function as an information processing device 1 include an image acquiring module, an operation detecting module, a specifying module, a display controlling module, and a function executing module. These programs or modules are activated by the CPU 2000 and other units to enable the computer 1900 to function as an operation input unit 10, a lock setting unit 12, a lock releasing unit 14, a changing unit 16, a password setting unit 18, a history recording unit 20, a comparing unit 22, a location acquiring unit 24, a movement detecting unit 26, an image input unit 28, and a control unit 50.

The information processing described in these programs are specific means activated by reading the programs to the computer 1900 so that the software cooperates with the various types of hardware resources described above. This information processing functions as an operation input unit 10, a lock setting unit 12, a lock releasing unit 14, a changing unit 16, a password setting unit 18, a history recording unit 20, a comparing unit 22, a location acquiring unit 24, a movement detecting unit 26, an image input unit 28, and a control unit 50. These specific means realize operations and the processing of information in accordance with the intended purpose of the computer 1900 in the present embodiment to construct an information processing device 1 for this intended purpose. For example, when the computer 1900 communicates with an external device, the CPU 2000 executes the communication program loaded in the RAM 2020, and instructs the communication interface 2030 in the communication processing on the basis of the processing content described in the communication program. The communication interface 2030 is controlled by the CPU 2000, and reads the transmitted data stored in the transmission buffer region of a memory device such as the RAM 2020, hard disk drive 2040, flexible disk 2090 or CD-ROM 2095 and transmits the data to the network, or writes reception data received from the network to a reception buffer region of the storage device. In this way, the communication interface 2030 transfers transmitted and received data to the storage device using the DMA (Direct Memory Access) method. Alternatively, the CPU 2000 transfers transmitted and received data by reading data from the source storage device or communication interface 2030, and transfers, and writing data to the destination communication interface 2030 or storage device. In addition, the CPU 2000 writes all of the data or the necessary data to the RAM 2020 via, for example, a DMA transfer, from files or databases stored in an external storage device such as a hard disk drive 2040, a CD-ROM drive 2060 (CD-ROM 2095) or a flexible disk drive 2050 (flexible disk 2090), and performs various types of processing on the data in the RAM 2020. The CPU 2000 then writes the processed data to the external storage device via, for example, a DMA transfer. Because the RAM 2020 temporarily stores the contents of the external storage device during this process, the RAM 2020 and the external storage device are generally referred to in the present embodiment as memory, a storage unit, or a storage device. The various types of information in the various types of programs, data, tables and databases of the present embodiment are stored in these memory devices, and are the targets of information processing. The CPU 2000 can hold some of the RAM 2020 in cache memory, and read and write data to the cache memory. Because the cache memory performs some of the functions of the RAM 2020 in this embodiment, cache memory is also included in the RAM 2020, the memory, and/or the storage device unless otherwise indicated.

The CPU 2000 also performs various types of processing on data read from the RAM 2020 including the operations, processing, condition determination, and information retrieval and replacement described in the present embodiment and indicated by a sequence of instructions in the program, and writes the results to the RAM 2020. For example, when performing a condition determination, the CPU 2000 compares various types of variables described in the present embodiment to other variables or constants to determine whether or not conditions such as greater than, less than, equal to or greater than, equal to or less than or equal to have been satisfied. When a condition has been satisfied (or not satisfied), the process branches to a different sequence of instructions or alternatively calls up a subroutine.

The CPU 2000 can also retrieve information stored in files and databases inside the memory device. For example, when a plurality of entries associating an attribute value for a second attribute to an attribute value for a first attribute, the CPU 2000 can retrieve an entry matching the conditions indicated by the attribute value of the first attribute among the plurality of entries stored in the storage device, and then obtaining the attribute value of the second value associated with the first value satisfying a predetermined condition by reading the attribute value of the second attribute stored in the entry. A program or module described above can be stored in a recording medium of an external unit. Instead of a flexible disk 2090 or a CD-ROM 2095, the recording medium can be an optical recording medium such as a DVD or CD, a magneto-optical recording medium such as MO, a tape medium, or a semiconductor memory such as an IC card. The recording medium can also be a storage device such as a hard disk or RAM provided in a server system connected to a dedicated communication network or the internet, and the program can be provided to the computer 1900 via the network.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

Further, as will be appreciated by one skilled in the art, aspects of the present disclosure may be embodied as a system, method, or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. An information processing device configured to enable user operations, comprising:
   hardware comprising a computer processing unit (CPU) and memory, the computer processing unit executing a program of the memory that configures the information processing device to:
   restrict user operations;
   responsive to restricting the user operations, transition the information processing device to a locked state after a period of inactivity;
   responsive to transitioning to the locked state, release the locked state in response to an input of characters of a predetermined first password; and
   change a number of the characters to be inputted in the predetermined first password to release the locked state, such that changing the number of the characters comprises, in response to inputting the characters within a certain proximity to a last user operation, allowing input of greater than a single character but less than all of the characters in the predetermined first password in order to release the locked state;
   where changing the number of the characters to allow input of greater than the single character but less than all of the characters in the predetermined first password to release the locked state comprises:
   requiring input of at least a first additional character along with the single character when the certain proximity to the last user operation is at least a first elapsed time since the last user operation;
   requiring input of at least a second additional character along with the single character when the certain proximity to the last user operation is at least a second elapsed time since the last user operation, the second elapsed time being greater than the first elapsed time; and
   requiring input of at least a third additional character along with the single character when the certain proximity to the last user operation is at least a third elapsed time since the last user operation, the third elapsed time being greater than the second elapsed time;
   where the last user operation is separate from input of greater than the single character but less than all of the characters in the predetermined first password.

2. The information processing device of claim 1, wherein the period of inactivity is a predetermined period of time elapsing before a last user input.

3. The information processing device of claim 2, wherein the number of characters to be inputted changes in response to an elapsed time since the last user input.

4. The information processing device of claim 3, wherein the number of characters to be inputted increases as the elapsed time increases.

5. The information processing device of claim 4, wherein the information processing device is released from the locked state in response to an input of a predetermined second password instead of the predetermined first password.

6. The information processing device of claim 5, further comprising allowing the user to set the predetermined first password as fewer characters than the second password when the information processing device has been released from the locked state.

7. The information processing device of claim 6, further comprising recording a usage history of the information processing device.

8. The information processing device of claim 7, further comprising comparing the current usage of the information processing device to the history.

9. The information processing device of claim 8, further comprising increasing a security level by increasing the number of characters to be inputted.

10. The information processing device in claim 9, wherein the security level is increased by reducing the elapsed time when the current usage of the information processing device is suspect with respect to the history.

11. The information processing device of claim 10, further comprising acquiring the location of the information processing device.

12. The information processing device of claim 11, further comprising detecting movement of the information processing device.

13. The information processing device of claim 12, further comprising inputting an image taken of the user using the information processing device.

14. The information processing device of claim 13, wherein the usage history includes images of the user immediately before the locked state of the information processing device has been released.

15. The information processing device of claim 14, wherein the security level is increased when there is a determination that a user attempting to release the information processing device from the locked state is different from a user who has previously released the locked state.

16. A computer program product for providing a locking function, the computer program product comprising a non-transitory computer readable storage medium having program code embodied therewith, the program code executable by an information processing device to:
   restrict user operations;
   responsive to restricting the user operations, transition the information processing device to a locked state after a period of inactivity;
   responsive to transitioning to the locked state, release the locked state in response to an input of characters of a predetermined first password;
   change a number of the characters to be inputted in the predetermined first password to release the locked state, such that changing the number of the characters comprises, in response to inputting the characters within a certain proximity to a last user operation, allowing input of greater than a single character but less than all of the characters in the predetermined first password in order to release the locked state;

where changing the number of the characters to allow input of greater than the single character but less than all of the characters in the predetermined first password to release the locked state comprises:

requiring input of at least a first additional character along with the single character when the certain proximity to the last user operation is at least a first elapsed time since the last user operation;

requiring input of at least a second additional character along with the single character when the certain proximity to the last user operation is at least a second elapsed time since the last user operation, the second elapsed time being greater than the first elapsed time; and requiring input of at least a third additional character along with the single character when the certain proximity to the last user operation is at least a third elapsed time since the last user operation, the third elapsed time being greater than the second elapsed time;

where the last user operation is separate from input of greater than the single character but less than all of the characters in the predetermined first password.

17. A method for releasing of a lock function for an information processing device, comprising:

restricting user operations, the information processing device having hardware comprising a computer processing unit (CPU);

responsive to restricting the user operations, transitioning the information processing device to a locked state after a period of inactivity;

responsive to transitioning to the locked state, releasing the locked state in response to an input of characters of a predetermined first password;

changing a number of the characters to be inputted in the predetermined first password to release the locked state, such that changing the number of the characters comprises, in response to inputting the characters within a certain proximity to a last user operation, allowing input of greater than a single character but less than all of the characters in the predetermined first password in order to release the locked state;

where changing the number of the characters to allow input of greater than the single character but less than all of the characters in the predetermined first password to release the locked state comprises:

requiring input of at least a first additional character along with the single character when the certain proximity to the last user operation is at least a first elapsed time since the last user operation;

requiring input of at least a second additional character along with the single character when the certain proximity to the last user operation is at least a second elapsed time since the last user operation, the second elapsed time being greater than the first elapsed time; and requiring input of at least a third additional character along with the single character when the certain proximity to the last user operation is at least a third elapsed time since the last user operation, the third elapsed time being greater than the second elapsed time;

where the last user operation is separate from input of greater than the single character but less than all of the characters in the predetermined first password.

18. The method of claim 17, wherein the period of inactivity is a predetermined period of time elapsing before a last user input.

19. The method of claim 18, wherein the number of the characters to be inputted changes in response to an elapsed time since the last user input.

20. The method of claim 19, wherein the number of the characters to be inputted increases as the elapsed time increases.

* * * * *